(12) United States Patent
Chen et al.

(10) Patent No.: US 11,983,532 B2
(45) Date of Patent: May 14, 2024

(54) OPTIMIZE BOUND INFORMATION ACCESSES IN BUFFER PROTECTION

(71) Applicant: International Business Machines Corporation, Armonk, NY (US)

(72) Inventors: Tong Chen, Yorktown Heights, NY (US); Richard H. Boivie, Monroe, CT (US); Alper Buyuktosunoglu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 17/137,708

(22) Filed: Dec. 30, 2020

(65) Prior Publication Data
US 2022/0206803 A1    Jun. 30, 2022

(51) Int. Cl.
*G06F 9/30* (2018.01)
*G06F 9/38* (2018.01)
*G06F 9/445* (2018.01)
*G06F 9/50* (2006.01)

(52) U.S. Cl.
CPC ...... *G06F 9/30043* (2013.01); *G06F 9/30127* (2013.01); *G06F 9/3836* (2013.01); *G06F 9/44505* (2013.01); *G06F 9/5027* (2013.01)

(58) Field of Classification Search
CPC ............. G06F 9/30043; G06F 9/30127; G06F 9/3836; G06F 9/44505; G06F 9/5027; G06F 8/41; G06F 8/75; G06F 2212/1024; G06F 2212/1052; G06F 9/30047; G06F 9/3013; G06F 9/383; G06F 12/1441; G06F 9/3004; G06F 3/0604; G06F 3/0614; G06F 3/0656; G06F 9/30101
See application file for complete search history.

(56) References Cited

U.S. PATENT DOCUMENTS

| 5,546,561 | A | 8/1996 | Kynett |
| 6,662,268 | B1 | 12/2003 | McBrearty |
| 8,468,244 | B2 | 6/2013 | Redlich et al. |
| 8,635,415 | B2 | 1/2014 | Patel |
| 8,762,694 | B1 | 6/2014 | Zou et al. |
| 9,535,613 | B2 | 1/2017 | Yazdani |

(Continued)

FOREIGN PATENT DOCUMENTS

| CN | 112149114 A | 12/2020 |
| CN | 114371951 A | 4/2022 |

(Continued)

OTHER PUBLICATIONS

CN-111124921-A, May 2020, Song J (Year: 2020).*

(Continued)

*Primary Examiner* — Farley Abad
(74) *Attorney, Agent, or Firm* — Robert D. Bean

(57) ABSTRACT

A method, system and apparatus for providing bound information accesses in buffer protection, including providing one-to-one mapping between a general-purpose register and bound information in a BI (bound information) register, saving loaded bound information in the BI register for future use, providing integrity of the bound information in the BI register that is maintained along program execution, and providing a pro-active load of the bound information with one-bit extra control on load instruction of the BI register.

20 Claims, 20 Drawing Sheets

(56) References Cited

U.S. PATENT DOCUMENTS

| | | | |
|---|---|---|---|
| 9,721,086 | B2 | 8/2017 | Shear et al. |
| 10,162,694 | B2 | 12/2018 | Stark |
| 10,509,907 | B2 | 12/2019 | Shear et al. |
| 11,429,590 | B2 | 8/2022 | Boivie |
| 2001/0007538 | A1 | 7/2001 | Leung |
| 2003/0126591 | A1* | 7/2003 | Wu .................. G06F 8/4442 717/158 |
| 2004/0068627 | A1 | 4/2004 | Sechrest |
| 2004/0117557 | A1* | 6/2004 | Paulraj ............... G06F 9/383 712/E9.047 |
| 2007/0143555 | A1 | 6/2007 | Nemiroff |
| 2009/0077097 | A1 | 3/2009 | Lacapra |
| 2009/0089548 | A1* | 4/2009 | Sung .............. G06F 9/30047 712/207 |
| 2010/0174893 | A1 | 7/2010 | Rivera |
| 2011/0078389 | A1* | 3/2011 | Patel ............. G06F 9/30105 712/225 |
| 2011/0167222 | A1 | 7/2011 | Lee |
| 2012/0084511 | A1* | 4/2012 | Dooley .............. G06F 9/3802 712/E9.055 |
| 2013/0054546 | A1 | 2/2013 | Solihin |
| 2014/0181386 | A1 | 6/2014 | Sadowski |
| 2014/0282312 | A1 | 9/2014 | Stamness |
| 2014/0283040 | A1 | 9/2014 | Wilkerson |
| 2016/0147466 | A1 | 5/2016 | Yazdani et al. |
| 2016/0170884 | A1 | 6/2016 | Eddy |
| 2017/0153926 | A1 | 6/2017 | Callegari |
| 2017/0344489 | A1 | 11/2017 | Kapoor |
| 2018/0089007 | A1 | 3/2018 | Gottschlich |
| 2018/0095720 | A1 | 4/2018 | Gopal |
| 2018/0176324 | A1* | 6/2018 | Kumar .............. H04L 67/025 |
| 2018/0232313 | A1 | 8/2018 | Nikoleris |
| 2018/0255589 | A1 | 9/2018 | Patil |
| 2019/0102567 | A1* | 4/2019 | Lemay ................ G06F 21/44 |
| 2019/0121716 | A1 | 4/2019 | Kurmus |
| 2019/0303263 | A1 | 10/2019 | Fleming, Jr. |
| 2019/0356412 | A1 | 11/2019 | Pitigoi-Aron |
| 2020/0034071 | A1 | 1/2020 | Gonzalez |
| 2020/0125497 | A1 | 4/2020 | Shi |
| 2020/0379809 | A1 | 12/2020 | Yudanov |
| 2020/0379908 | A1 | 12/2020 | Curewitz |
| 2021/0234507 | A1 | 7/2021 | Pozsgay |
| 2022/0121644 | A1 | 4/2022 | Boivie |
| 2022/0206943 | A1 | 6/2022 | Chen |
| 2022/0358116 | A1 | 11/2022 | Boivie |

FOREIGN PATENT DOCUMENTS

| | | |
|---|---|---|
| CN | 114691027 A | 7/2022 |
| CN | 114691543 A | 7/2022 |
| DE | 102021130906 A | 6/2022 |
| DE | 102021131418 A1 | 6/2022 |
| GB | 2572151 B | 7/2020 |
| GB | 2605678 A | 10/2022 |
| GB | 2604201 B | 2/2023 |
| GB | 2605242 B | 6/2023 |
| JP | 61228539 A | 10/1986 |
| JP | 2022104872 A | 7/2022 |
| JP | 2022104879 A | 7/2022 |

OTHER PUBLICATIONS

Mel, et al. "The NIST Definition of Cloud Computing". Recommendations of the National Institute of Standards and Technology. Nov. 16, 2015.
Authors, et al., "DMA Indirection Optimization and Buffer Identification for Adapter Mapped Memory", An IP.com Prior Art Database Technical Disclosure, IP.com No. IPCOM000155024D, Jul. 17, 2007.
Authors, et al., "Method for Optimizing DMA Translation Performance through Multiple I/O Page Sizes Within a Single Translation Table", An IP.com Prior Art Database Technical Disclosure, IP.com No. IPCOM000241257D, Apr. 9, 2015.
Authors, et al., "Mapper Recovery and Mullicode Register Deallocation", An IP.com Prior Art Database Technical Disclosure, IP.com No. IPCOM000256698D, Dec. 20, 2018.
Nagarakatte, et al., "WatchdogLite: Hardware-Accelerated Compiler-Based Pointer Checking", 2014.
Zhang, et al., "BOGO: Buy Spatial Memory Safety, Get Temporal Memory Safety (Almost) Free" 2019 Association for Computing Machinery.
Zheng, J. "Buffer Overflow Vulnerability Diagnosis for Commodity Software", M.S., Northeastern University, Boston, 2001.
"2019 CWE Top 25 Most Dangerous Software Errors," https://cwe.mitre.org/top25/archive/2019/2019_cwe_top25.html, 2019, 7 pages.
"Eclypsium. There's a Hole in the Boot—Boothole," https://eclypsium.com/2020/07/29/theres-a-hole-in-the-boot/, Jul. 29, 2020, 16 pages.
"Oracle—Hardware-Assisted Checking Using Silicon Secured Memory (SSM)," https://docs.oracle.com/cd/E37069_01/html/E37085/gphwb.html, 2015, 9 pages.
"Protecting Against Out-Of-Bounds Buffer References," U.S. Appl. No. 16/601,633, filed Oct. 14, 2019.
Akritidis et al. "Baggy Bounds Checking: An Efficient and Backwards-Compatible Defense against Out-of-Bounds Errors." USENIX Security Symposium. 2009.
Berger et al., "DieHard: Probabilistic Memory Safety for Unsafe Languages," Acm sigplan notices, 41(6):158-168, 2006, 11 pages.
Brunink et al., . "Boundless memory allocations for memory safety and high availability." 2011 IEEE/IFIP 41st International Conference on Dependable Systems & Networks (DSN). IEEE, 2011.
Combined Search and Examination Report under Sections 17 and 18(3) received for G.B. Patent Application Serial No. 2113829.2 dated Jun. 6, 2022, 9 pages.
Devietti et al. "HardBound: Architectural Support for Spatial Safety of the C Programming Language." ASPLOS'08, Mar. 1-5, 2008, Seattle, Washington, USA. (2008).
Disclosed Anonymously, et al. "Method and Apparatus for Memory Shmooing" IP.com No. IPCOM000216652D, Apr. 11, 2012.
Disclosed Anonymously, et al., "Set up Data Access Break Register to detect Stack Overflow", IP.com No. IPCOM000257394D, Feb. 8, 2019.
Duck et al., "Stack Bounds Protection with Low Fat Pointers," In NDSS, Feb. 27, 2017, 15 pages.
Duck et al., "Heap Bounds Protection with Low Fat Pointers," In Proceedings of the 25th International Conference on Compiler Construction, 2016, 11 pages.
github.com, "shellphish/how2heap," https://github.com/shellphish/how2heap, Retrieved from the Internet: Apr. 21, 2022.
Intel MPX Explained: Oleksii Oleksenko, et al., "A Cross-layer Analysis of the Intel MPX System Stack", https://Intel-MPX.github.io, ACM Meas., Anal. Computer System, vol. 2, No. 2, Article 28, Jun. 2018.
Jim et al., "Cyclone: A safe dialect of C," In USENIX Annual Technical Conference, General Track, 2002, 14 pages.
Kosmatov et al., "An optimized memory monitoring for runtime assertion checking of C programs." International Conference on Runtime Verification. Springer, Berlin, Heidelberg, 2013.
Kwon et al. "Low-Fat Pointers: Compact Encoding and Efficient Gate-Level Implementation of Fat Pointers for Spatial Safety and Capability-based Security." CCS'13, Nov. 4-8, 2013, Berlin, Germany.
Lowe-Power et al., "The gem5 Simulator: Version 20.0+," arXiv:2007.03152v1 [cs.AR] Jul. 7, 2020, 20 pages.
Miller, "SSTIC-2020. Pursuing Durably Safe Systems Software," https://github.com/microsoft/MSRC-Security-Research/tree/master/presentations/2020_06_SSTIC, 2020, 16 pages.
Nagarakatte et al., "CETS: Compiler-Enforced Temporal Safety for C," In Proceedings of the 2010 international symposium on Memory management, 2010, 10 pages.
Nagarakatte et al., "SoftBound: highly compatible and complete spatial memory safety for c," In Proceedings of the 30th ACM SIGPLAN Conference on Programming Language Design and Implementation, 2009, 14 pages.

(56) References Cited

OTHER PUBLICATIONS

Nagarakatte et al., "Watchdog: Hardware for Safe and Secure Manual Memory Management and Full Memory Safety," In 2012 39th Annual International Symposium on Computer Architecture (ISCA), IEEE, 2012, 12 pages.
Necula et al., "CCured Type-Safe Retrofitting of Legacy Code," In Proceedings of the 29th ACM SIGPLAN-SIGACT symposium on Principles of programming languages, 2002, 12 pages.
Oleksenko et al., "Intel MPX Explained: A Cross-layer Analysis of the Intel MPX System Stack," Proceedings of the ACM on Measurement and Analysis of Computing Systems, 2(2):1-30, Jun. 2018, 30 pages.
Orman, "The Morris Worm: A Fifteen-Year Perspective," IEEE Security & Privacy, 1(5):35-43, 2003, 9 pages.
Phillips, "AddressSanitizerAlgorithm," https://github.com/google/sanitizers/wiki/AddressSanitizerAlgorithm, 2017, 7 pages.
Roemer et al., "Return-Oriented Programming: Systems, Languages, and Applications," ACM Transactions on Information and System Security (TISSEC), 15(1):1-34, 2012, 42 pages.
Sasaki et al., "Practical Byte-Granular Memory Blacklisting using Califorms," In Proceedings of the 52nd Annual IEEE/ACM International Symposium on Microarchitecture, 2019, 14 pages.
Serebryany et al., "AddressSanitizer: A Fast Address Sanity Checker," Presented as part of the 2012 USENIX Annual Technical Conference (USENIX ATC 12), 2012, 10 pages.
Serebryany et al., "Adopting the Arm Memory Tagging Extension in Android," https://security.googleblog com/2019/08/adopting-arm-memory-tagging-extension.html, Aug. 2, 2019, 4 pages.
Serebryany et al., "Memory Tagging and how it improves C/C++ memory safety," arXiv: 1802.09517 [cs.CR], 2018, 14 pages.
Serebryany, "Oss-fuzz—google's continuous fuzzing service for open source software," Vancouver, BC, Aug. 2017. USENIX Association, 28 pages.
Sethumadavan, "Blacklisting vs Whitelisting for memory safety," https://developer.arm.com/-/media/Files/ResearchSummit19/1C_02_SimhaSethumadhaven.pdf, ARM Research Summit, 2019, 36 pages.
Sharifi et al., "CHEx86: Context-Sensitive Enforcement of Memory Safety via Microcode-Enabled Capabilities," 2020 ACM/IEEE 47th Annual International Symposium on Computer Architecture (ISCA), pp. 762-775. IEEE, 2020, 14 pages.
Sinha et al., "Practical Memory Safety with REST," 2018 ACM/IEEE 45th Annual International Symposium on Computer Architecture (ISCA), IEEE, 2018, 12 pages.
Szekeres et al., "SoK: Eternal War in Memory," 2013 IEEE Symposium on Security and Privacy, IEEE, 2013, 15 pages.
UK Response to Examination, dated Aug. 2, 2022, in UK Patent Application No. 2117483.4.
Woodruff et al., "CHERI Concentrate: Practical Compressed Capabilities," IEEE Transactions on Computers, 68(10):1455-1469, 2019, 15 pages.
Woodruff et al., "The CHERI capability model: Revisiting RISC in an age of risk," In 2014 ACM/IEEE 41st International Symposium on Computer Architecture (ISCA), IEEE, Jun. 2014, 12 pages.
Xia et al., "CHERIvoke: Characterising Pointer Revocation using CHERI Capabilities for Temporal Memory Safety," . In Proceedings of the 52nd Annual IEEE/ACM International Symposium on Microarchitecture, MICRO '52, 2019, 13 pages.
Younan et al., "PAriCheck: An Efficient Pointer Arithmetic Checker for C Programs," In Proceedings of the 5th ACM Symposium on Information, Computer and Communications Security, 2010, 12 pages.

\* cited by examiner

FIG. 7

| | BIRp | BIRq | BIRr |
|---|---|---|---|
| float * p = x+f1 // &x.f1, bufferA | NULL-BI | N/A | N/A |
| float *q = x+f2. //&x.f2, bufferA | NULL-BI | NULL-BI | N/A |
| float t = load p // t= *p | BI for bufferA | NULL-BI | N/A |
| int diff = p-q | BI for bufferA | NULL-BI | N/A |
| Float * r = x+f3 //&x.f3, bufferB | BI for bufferA | NULL-BI | NULL-BI |
| t = t+diff | BI for bufferA | NULL-BI | BI for bufferA |

Load instruction 402

```
GPRv = Load GPRa    // load from address GPRa to GPRv

//check bound of address for load
get_index:
    Use BMR to get the bits from GPRa;
    do shift of the bits to get the index value, idx If (idx is a reserved index)
        goto actual_operation;

restore_pointer:
    Copy Ra to real_a;
    Get the leading bit in actual_a with BMR;
    Fill the free bits of real_a with 1, if the leading bit is 1, fill 1, otherwise 0;

load_BI:
    if (BIRa is not NULL-BI and idx == BIRa.index) {
        LB, UB = BIRa.LB, BIRa.UB;
    } else {
        address for BI entry: entry_addr = IBTR+(idx<<4)
        Load bound info: LB, UB = actual_load 16 bytes from entry_addr
        BIRa = (idx, LB, UB)
    }
```

```
//... continue from left column check_BI:
    if (addr<LB or addr+datasize>UB)
        raise out-of-bound exception actual_operation:
    Rv=actual_load actual_a Set_result_BI:
    BIRv = NULL-BI;
    If (this load is NOT marked for BI prefetch) goto End;

//Get BI for GPRv. Similar to operation on address
    Use BMR to get the bits from GPRv;
    do shift of the bits to get the index value, idx_v
    If (idx_v is a reserved index) goto End;

Entry_addr_v = IBTR+(idx_v<<4)
    LBv, UBv = actual_load 16 bytes from entry_addr_v
    BIRa = (idx_v, LBv, UBv)

End:
```

FIG. 8B

Store instruction 412 store GPRa, GPRv   // store GPRv to address GPRa

//check bound of address for store
get_index:
  Use BMR to get the bits from GPRa;
  do shift of the bits to get the index value, idx If (idx is a reserved index) goto actual_operation;

restore_pointer:
  Copy Ra to real_a;
  Get the leading bit in actual_a with BMR;
  fill the free bits of real_a with 1, if the leading bit is 1, fill 0, otherwise 0;

load_BI:
  if (BIRa is not NULL_BI) and idx == BIRa.index {
      LB, UB = BIRa.LB, BIRa.UB;
  } else {
      address for BI entry: entry_addr = IBTR+(idx<<4)
      Load bound info: LB, UB = actual_load 16 bytes from entry_addr
      BIRa = {idx, LB, UB};
  }

// ... continue from left column check_BI:
  if (addr<LB or addr+datasize>UB)
      raise out-of-bound exception actual_operation:
  actual_store actual_GPRa, GPRv

OPTIMIZE BOUND INFORMATION ACCESSES IN BUFFER PROTECTION

CROSS REFERENCE TO RELATED APPLICATIONS

The present application is a related Application of co-pending U.S. patent application Ser. No. 17/137,666, which is concurrently filed on Dec. 30, 2020, and U.S. patent application Ser. No. 17/071,257, which was filed on Oct. 15, 2020, the entire contents of which are incorporated herein by reference.

BACKGROUND

The present invention relates to an embodiment of a method, apparatus, and system for bound information accesses, and more particularly, but not by way of limitation, relates to a method, apparatus, and system for optimizing bound information accesses in buffer protection.

Memory safety vulnerabilities (e.g., buffer overflow, race condition, page fault, null pointer, stack exhaustion, heap exhaustion/corruption, use after free, or double free, etc.) happen when software, accidentally or intentionally, accesses system memory in a way that exceeds its allocated size and memory addresses.

Programs such as C and C++, which have been used extensively in certain operating systems and other programs, can lead to a plurality of memory safety errors that attackers can exploit with dangerous and intrusive consequences, such as remote code execution or elevation of privilege flaws, etc. For example, by reading out-of-bounds memory, an attacker might be able to get secret values, such as memory addresses, which can bypass protection mechanisms.

Therefore, there is a need to have techniques that can reduce or eliminate memory safety vulnerabilities in an efficient manner.

SUMMARY

In view of the foregoing and other problems, disadvantages, and drawbacks of the aforementioned background art, an exemplary aspect of the disclosed invention provides a method, apparatus, and system for optimizing bound information accesses in buffer protection.

An embodiment of the present invention, a method for providing bound information accesses in buffer protection, including providing one-to-one mapping between a general-purpose register and the bound information in a BI (bound information) register, saving loaded bound information in the BI register for future use, providing integrity of the bound information in the BI register that is maintained along program execution, and providing a pro-active load of the bound information with one-bit extra control on load instruction of the BI register.

An embodiment of the present invention, a system for providing bound information accesses in buffer protection, includes a memory storing computer instructions, and a processor configured to execute the computer instructions to provide one-to-one mapping between a general-purpose register and the bound information in a BI (bound information) register, save loaded bound information in the BI register for future use, provide integrity of the bound information in the BI register that is maintained along program execution, and provide a pro-active load of the bound information with one-bit extra control on load instruction of the BI register.

Another embodiment of the present invention, a computer program product comprising a computer readable storage medium having program instructions embodied therewith, the program instructions readable and executable by a computer to cause the computer to perform a method for providing bound information accesses in buffer protection, including providing one-to-one mapping between a general-purpose register and the bound information in a BI (bound information) register, saving loaded bound information in the BI register for future use, providing integrity of the bound information in the BI register that is maintained along program execution, and providing a pro-active load of the bound information with one-bit extra control on load instruction of the BI register.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 7 illustrates example instructions in an embodiment of present invention.

FIG. 8A illustrates an example load instruction in an embodiment of present invention.

FIG. 8B illustrates an example store instruction in an embodiment of present invention.

DETAILED DESCRIPTION

Figure 1A:
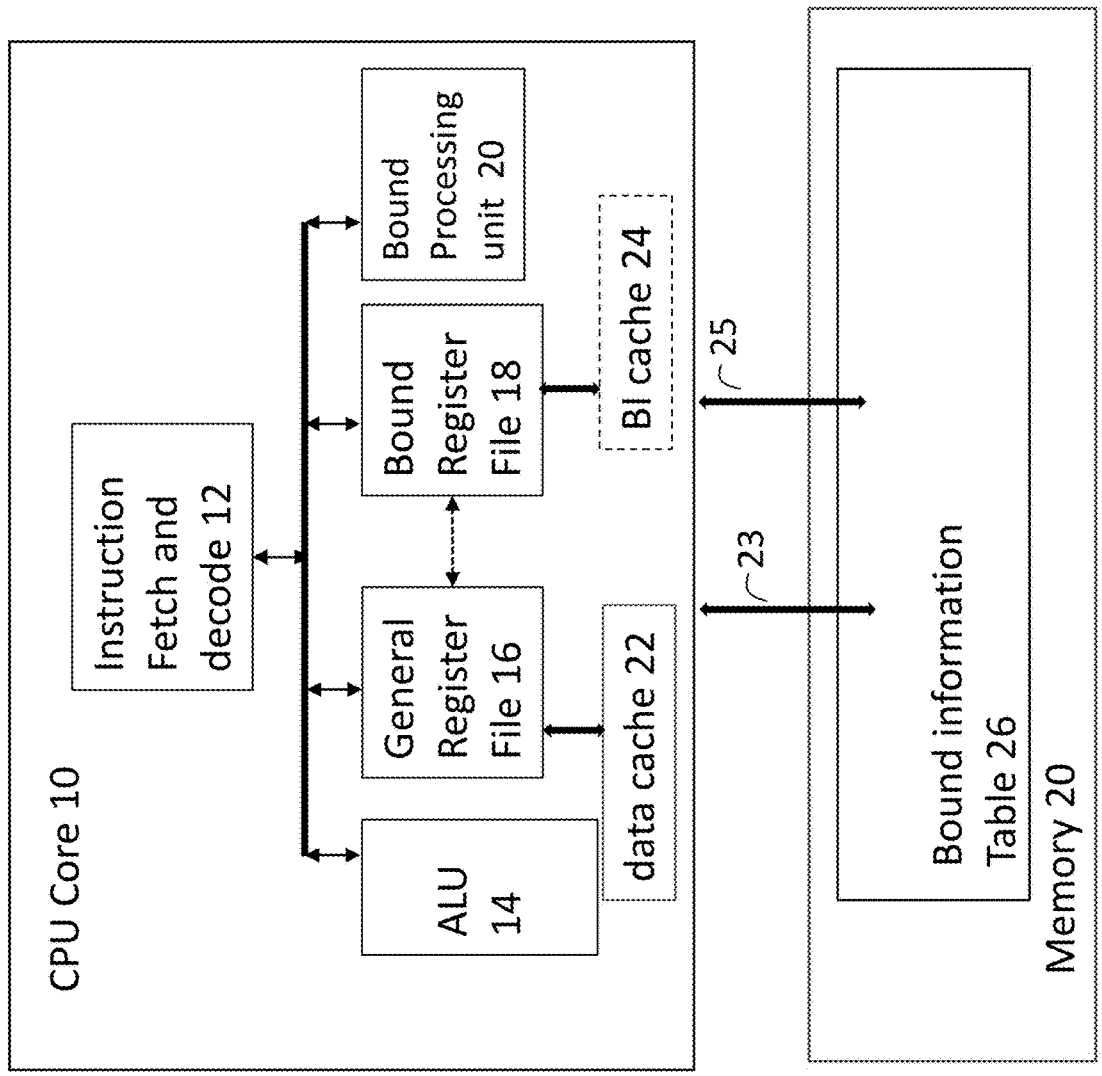
FIG. 1A illustrates an example system of an embodiment of the present invention.

The invention will now be described with reference to the drawing figures, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims. Moreover, please note that any of the steps can be performed in different sequences or combined or at the same time. In addition, any of structures and embodiments shown can be modified or combined.

Memory references that are out of its bound may cause serious security problems. Buffer Overflow vulnerabilities have been a problem for at least 30 years, e.g., Morris Internet Worm (1988). Buffer Overflow bugs have enabled many forms of attack including buffer-overflow based code injection, Return-Oriented Programming (ROP), "HeartBleed".

Some work has been done to address buffer overflow attacks or the effects of buffer overflow attacks, e.g. "stack canaries", W XOR X memory pages, ASLR, "shadow stacks" & other approaches for protecting "control flow integrity").

Oracle Silicon Secured Memory (SSM) ("Colors" data in memory & prevents access by pointers that have "the wrong color". SSM has some limitations such as only 14 colors, granularity of protected data is 64 bytes.

It is important to check whether each memory reference, load or store, is within its memory boundary. One existing solution is INTEL's Memory Protection Extensions (MPX) system. MPX introduced new ISA (instruction set architecture) and hardware support for precise bound check. In memory, bound information (BI) for each buffer is stored/retrieved with pointer value as key. In the core, pointer and its BI are in registers and mapping is maintained with extra instructions added by the compiler. Original computation and bound protection operation share the same hardware resource. There are other methods that attempt to remove or reduce the memory safety vulnerabilities.

However, all these other solutions have one major problem of needing a plurality of instructions to be added and also costly implementation. As a result, the number of instructions may increase four or more times and the execution time can be increased to two or more times even when the bound checking is turned off.

INTEL MPX protects buffers from out-of-bound reference with precise bound information (BI). MPX stores BI of buffers in BI table through hashing of pointer values. The BI for a pointer is put into a general register when the pointer is loaded. The bookkeeping code is added to propagate BI in register to its consumer: load/store instructions. Bound checking instructions are inserted before load/store.

The additional problems with MPX are that the load of BI may not be used and there is two-level memory access for BI. Other conventional methods have problems with leading to excessive load requests for BI entry, and BI is loaded and used in the same instruction, and so latency is not hidden.

There is need to detect when references to array elements including pointer references to array elements (e.g. x[i], *p++, p→foo) are out of bounds).

There is a need to be able to do this without re-writing existing programs and without significant space or time overhead.

The present invention solves the above-mentioned problems with memory safety vulnerabilities and without issues of increasing the number of instructions like previous solutions.

The present invention provides precise protection where it protects every buffer and precision to the byte. The present system is applicable on C/C++ applications and other programs that may have memory issues, where there is arbitrary pointer arithmetic, and number of buffers to be protected in one application may range from thousands to millions.

FIG. 1A illustrates an example system of an embodiment of the present invention. This is a non-limiting example, and other configurations can be made. The system 100 includes a CPU (central processing unit) core 10 and a memory 20. The CPU Core 10 includes an instruction fetch and decode 12, ALU (arithmetic logic unit) 14, general file register 16, bound register file 18, bound processing unit 20. The general file register communicates with the data cache 22, while the bound register file 18 is linked with the bound information (BI) cache 24. The bound information (or bounds-information) cache 24 can be added to limit any slowdown from accesses to the bound information table 26 in memory 20.

Figure 1B:
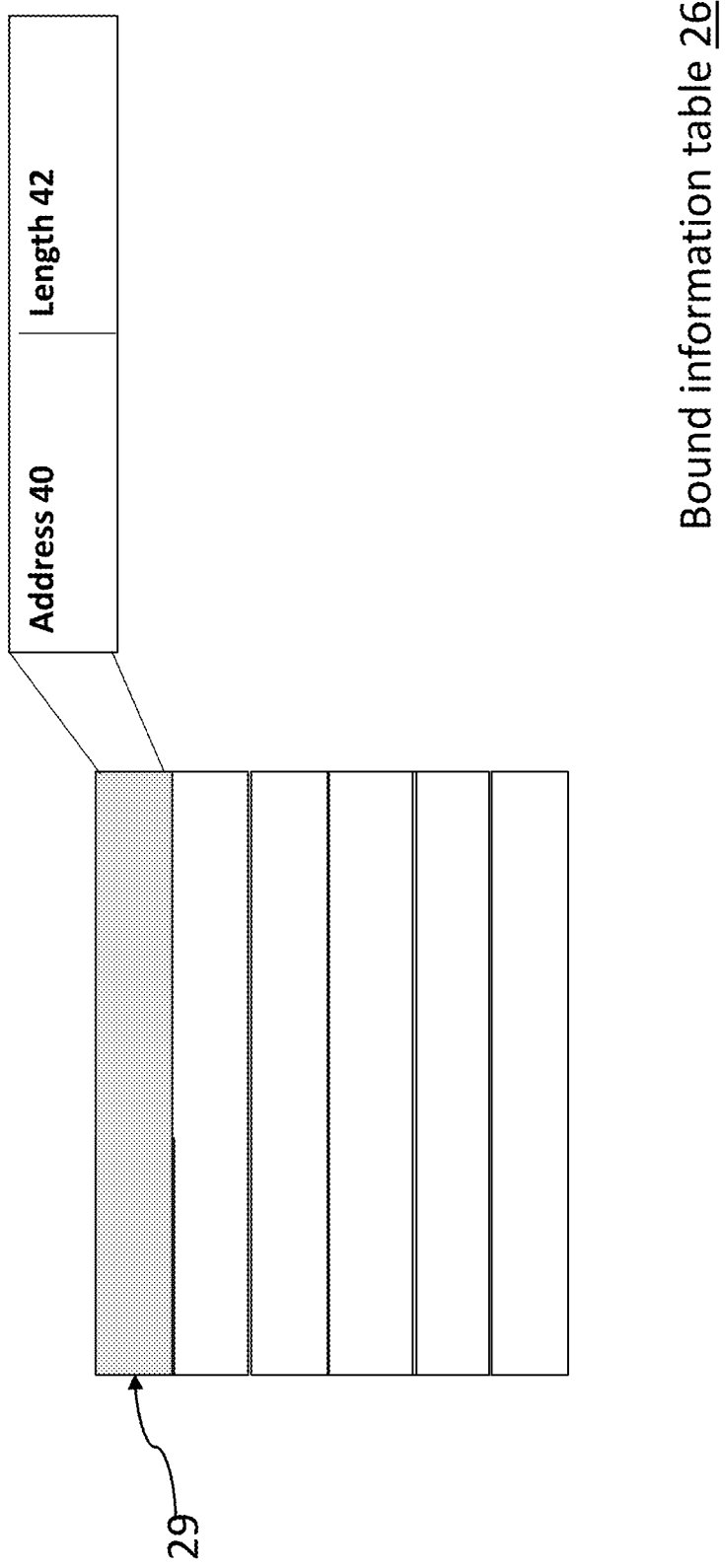
FIG. 1B illustrates a non-limiting example of a Bound information table of an embodiment of the present invention.

FIG. 1B illustrates a non-limiting example of a Bound information table of an embodiment of the present invention.

The BI table 26 can be organized as a linear table including a plurality of BI entries 29 with each BI entry including a base-address field 40 and an object-size or length field 42. Each BI entry of BI table 26 can be associated with a heap object. Accessing a particular BI entry of the BI table 26 corresponding to a given object can involve a single table-lookup. The single table-lookup can, for example, involve using an index that can be embedded into a pointer during object allocation.

Referring back to FIG. 1A, the CPU Core 10 communicates information with the BI table 26 in memory via paths 23 and 26. Again, different configurations can also be provided as this is merely an example.

In general, the present invention introduces BI register 18 to hold bound information (or called, e.g., boundary information or bounds-information). When the bound information is loaded for bound checking for load/store instruction, the system 100 saves it into BI register 18.

The system 100 avoid loads of BI for the load from the same buffer. The system 100 is able to maintain BI register 18 by hardware. The present invention is able to propagate the BI among the BI registers 18 for pointers pointing to the same buffer, and not just using the same register. There are no extra instructions added in the code by present invention. The system 100 loads BI register 18 when the pointer is loaded from memory 20. The present invention is able to prefetch BI to hide the latency, propagate BI to more pointers, and is helped by the compiler to avoid unprofitable prefetch.

The present invention uses BI register 18 by load/store where bound check with the BI register 18 is by hardware and there is no change of code needed for such a check.

Figure 2:
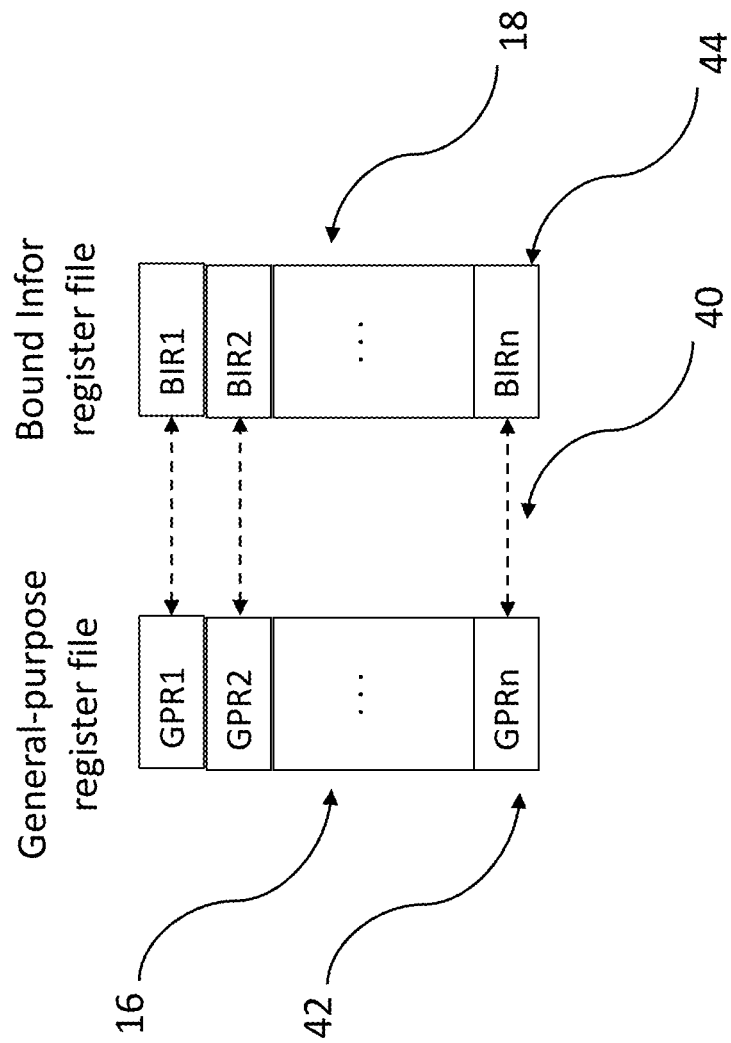
FIG. 2 illustrates a bound information register file and a general-purpose register file of an embodiment of present invention.

FIG. 2 illustrates a bound information register file and a general-purpose register file of an embodiment of present invention.

The BI Register File 18 is further detailed as follows with the help of FIG. 2. There is a one-to-one mapping (virtually) 40 between the general-purpose register 18 and BI register 18. The BIRi (or BIRn shown, where n is an integer) 44 entry holds the bound information for the general-purpose register information GPRi (or GPRn shown, where n is an integer) 42 with identity mapping.

The BI registers 18 are not directly used in the instructions. The BI register file 18 is accessed implicitly with the index of general-purpose register file 16 in the instruction.

Figure 3:
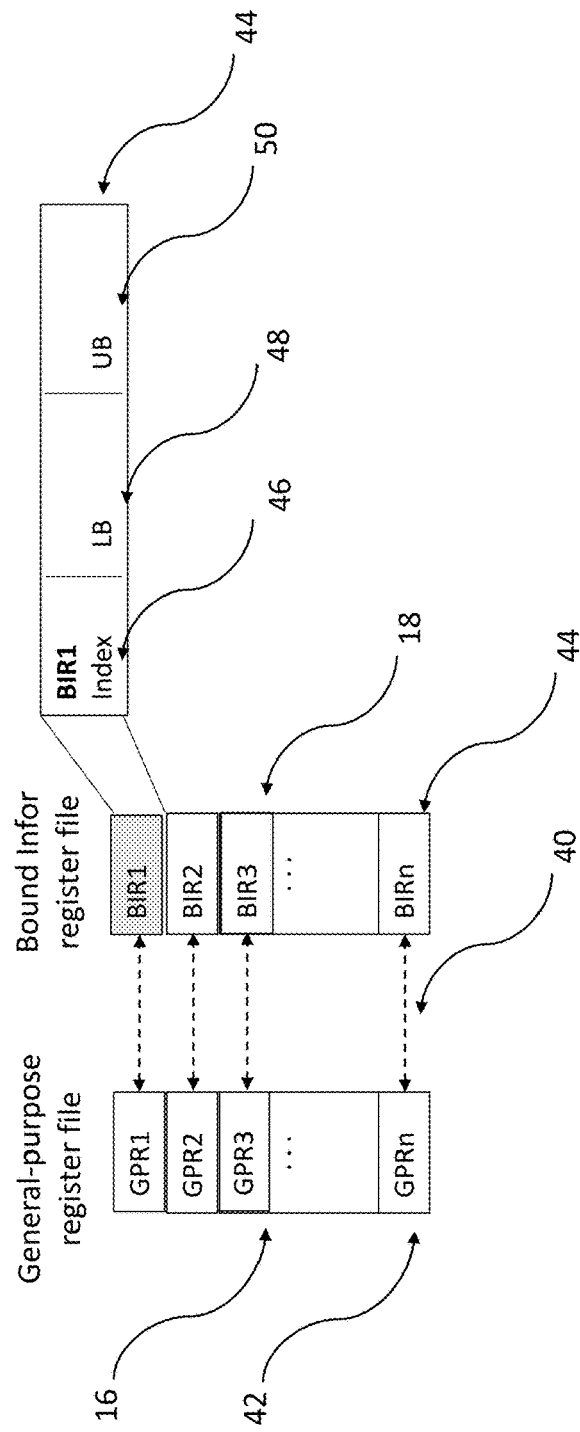
FIG. 3 illustrates a bound information register file of an embodiment of present invention.

FIG. 3 illustrates a bound information register file of an embodiment of present invention.

Referring to FIG. 3, each BI register 18 has three fields: (index 46, LB (lower bound) 48, UB (upper bound) 50). As seen in the example, the upper bound (UB) 50 is the right most cell 50. The Index 46 is described in the next paragraph.

The "unused bits" in a pointer are re-purposed to check or keep track of a range of addresses that can be accessed via the pointer. For example, in 64-bit architectures, object-pointers have unused bits, as they generally store virtual-addresses with 48-bits of information or less. The disclosed techniques can leverage these unused bits to: (a) allocate an entry in a bounds-table to store the bounds-information when an object is allocated; (b) re-purpose the unused bits (e.g., top-bits) of the object-pointer to store the index to the bounds-table entry; (c) automatically propagate the index when subsequent addresses are derived via assignment statements or pointer arithmetic; and/or (d) execute bounds-checking in hardware on load and store instructions by using the index bits in an address to access the appropriate bounds-information.

Figure 4:
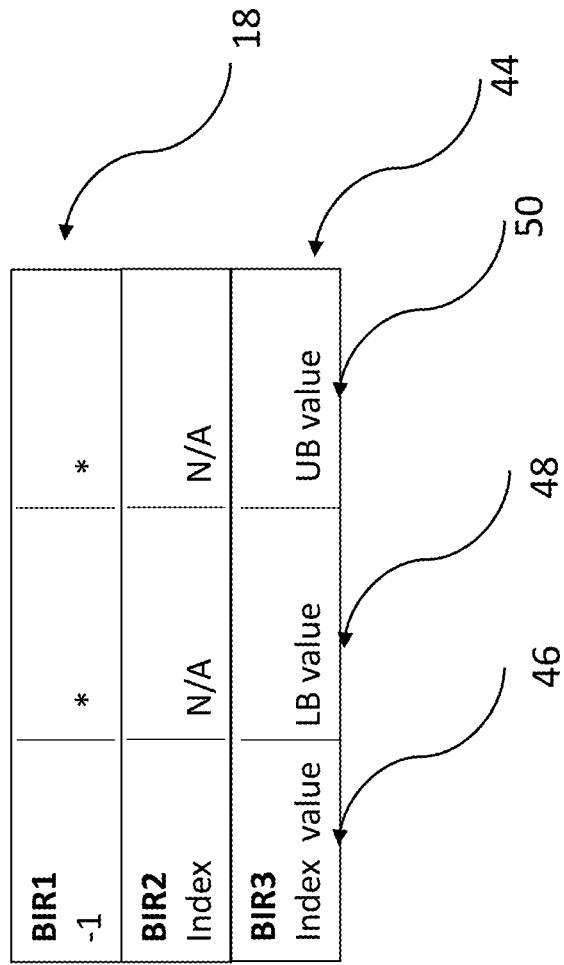
FIG. 4 illustrates the states of the bound information register file of an embodiment of present invention.

FIG. 4 illustrates the states of the bound information register file of an embodiment of present invention.

The lower bound LB 48 and upper bound 50 are for the buffer. There are three states for a BI register file 18. A first state is "Not-pointer", which is the data in the paired general-purpose register 16 is not a pointer. The "Not-pointer" state can be represented as (−1, *, *) as seen in example bound information BIR1.

The second state is "Index-only" state which is the data in the paired general-purpose register 16 is a pointer but its bound information is not loaded yet. The "Index-only" state can be represented as (index, N/A, N/A) as seen in example bound information BIR2. "N/A" stands for not available and index value is provided.

The third state is the "BI-loaded" state, which is when the bound information has been loaded. The BI register 18 then contains (index, LB, UB) as seen in example bound information BIR3. The third state would then include the bound information values for the index 46, lower bound 48, and upper bound 50. It is assumed that there is a quick way to detect the state of a BI register 18. Other states can also be added or a state can be removed.

The BI register files 18 are part of a machine state, where there is a save/restore, or set all to NULL-BI (NULL-Bound information) when restoring context without saving them. For example, the index 0x0 can be reserved for the NULL pointer (e.g., pointer-value "0") to support free called on NULL pointer.

Figure 5:
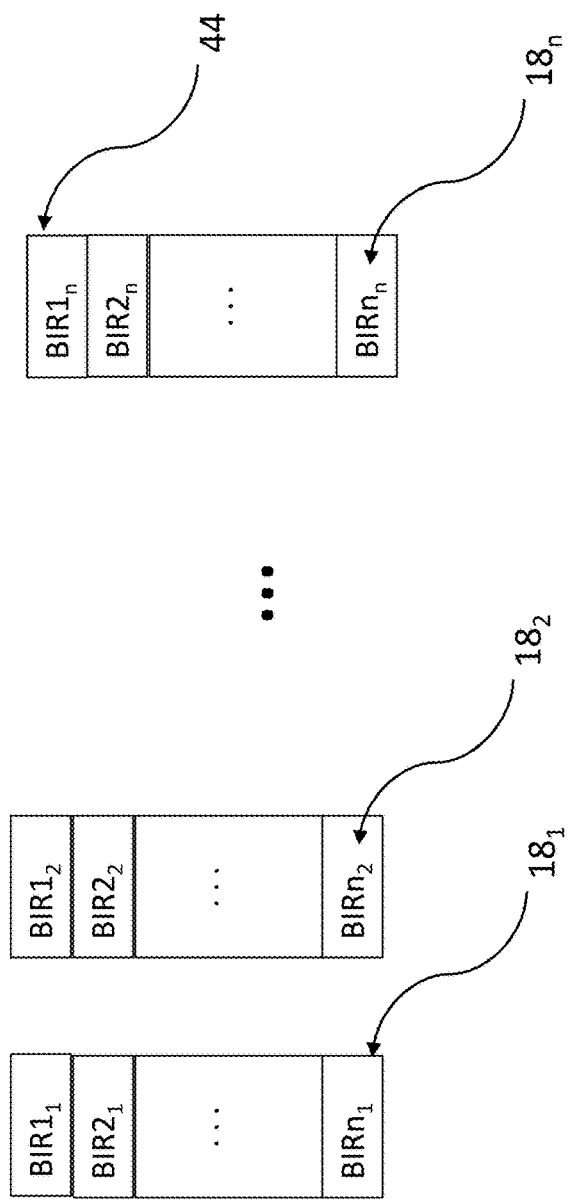
FIG. 5 illustrates a plurality of BI register files of an embodiment of present invention.

FIG. 5 illustrates a plurality of BI register files. A system 200 similar to system 100 of FIG. 1A can include a plurality of BI registers from $18_1$ to $18_n$, where n is an integer.

Figure 6A:
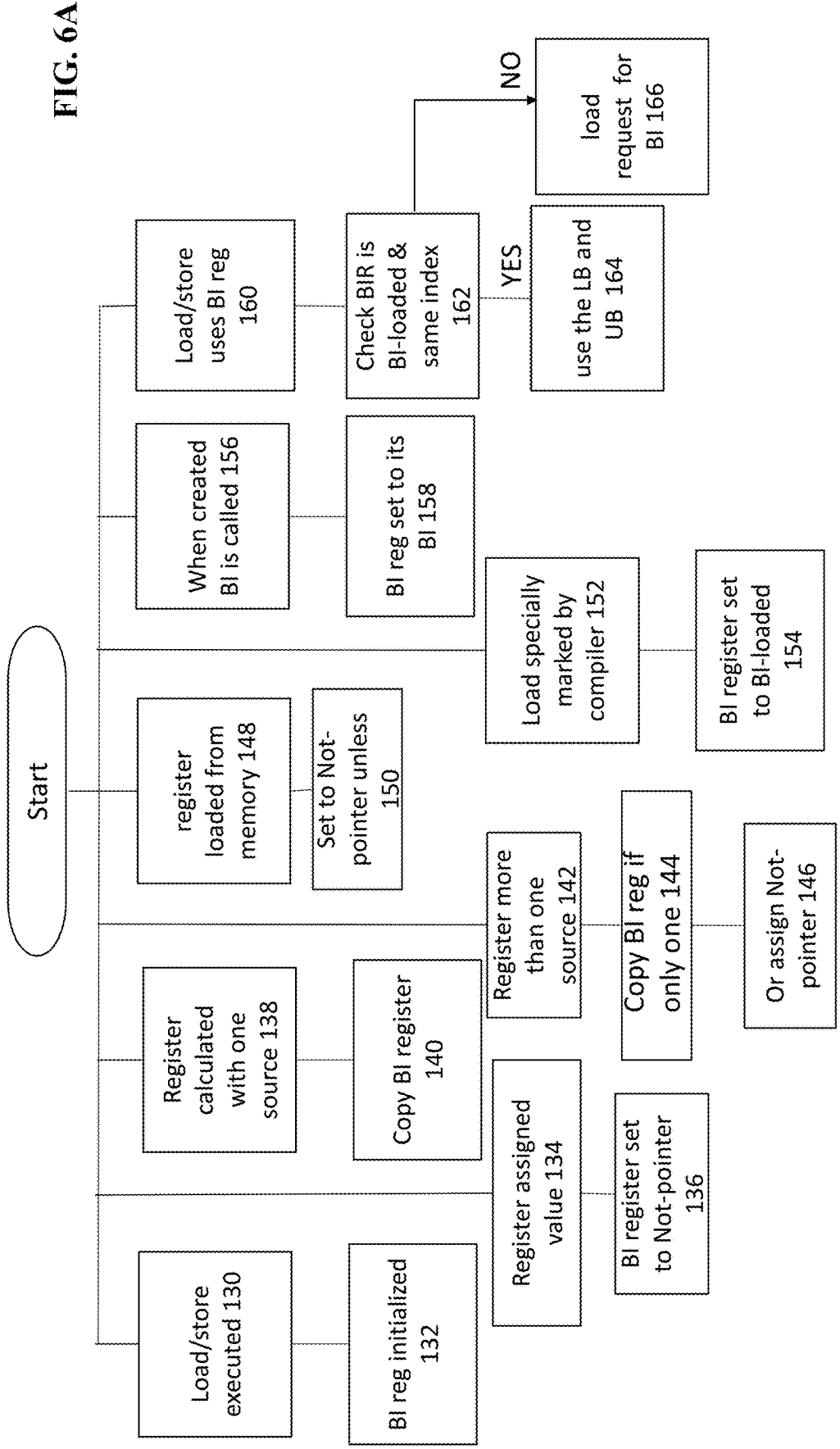
FIG. 6A illustrates the maintaining of BI register files of an embodiment of present invention.
Figure 6B:
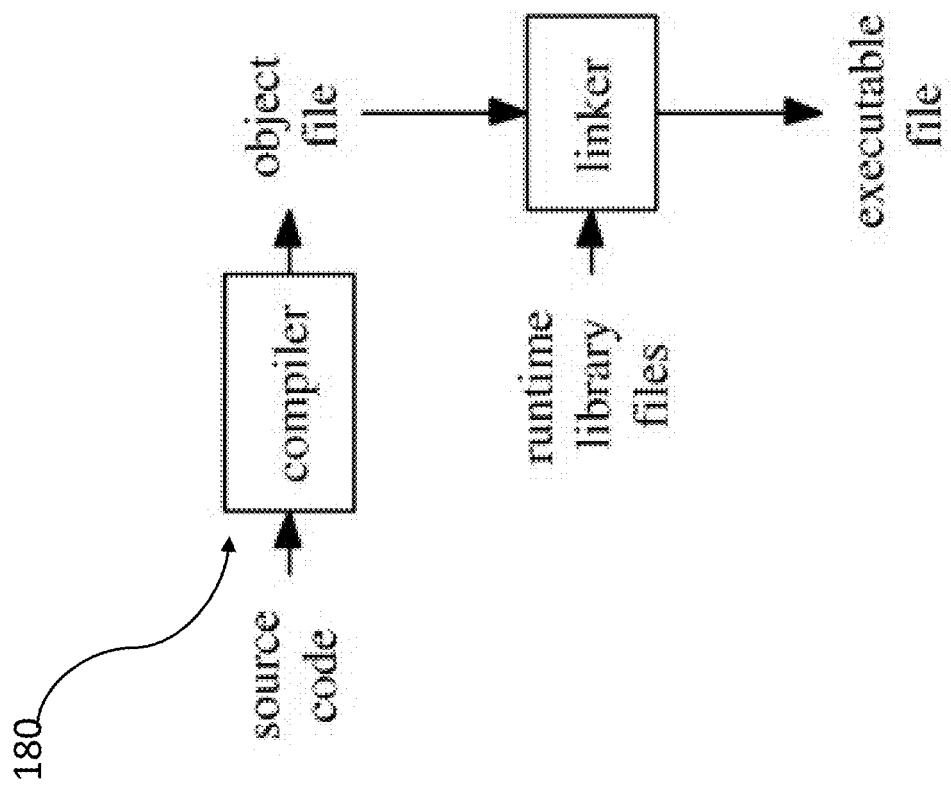
FIG. 6B illustrates an example compiler 180 used in C/C++.
Figure 6C:
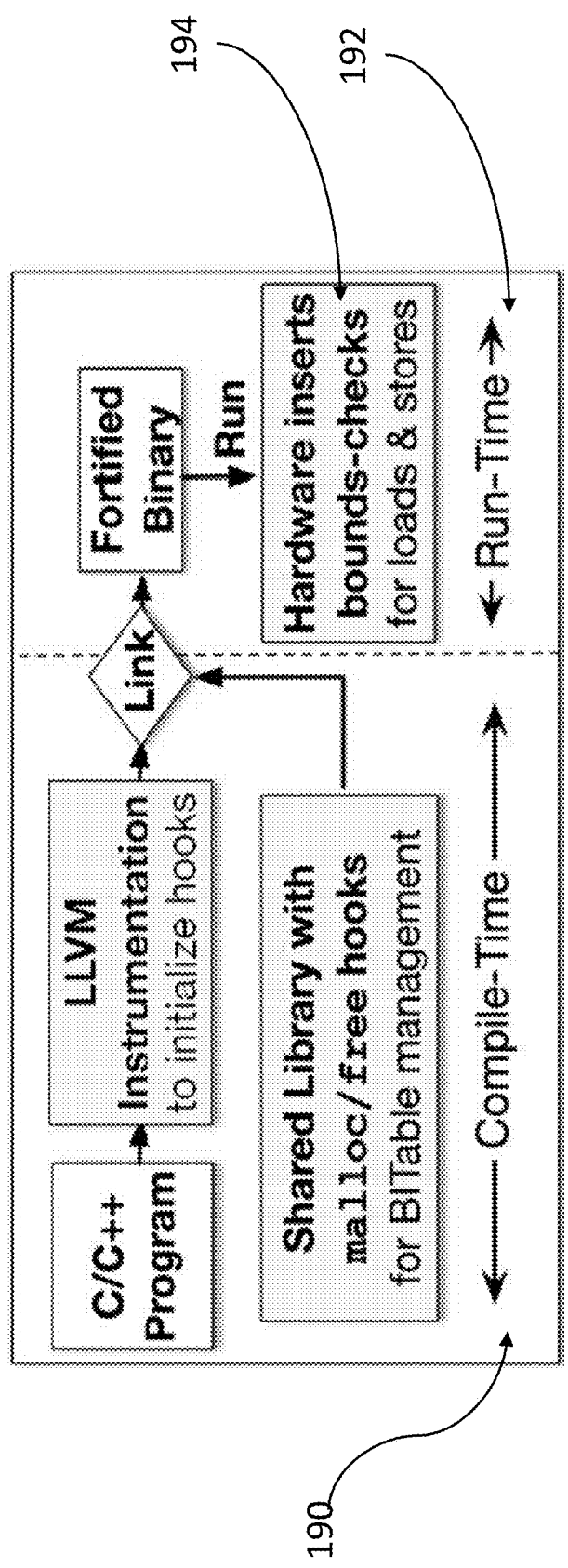
FIG. 6C illustrates an example run-time 190 and compile time 192 in C/C++.

FIG. 6A illustrates the maintaining of BI register files of an embodiment of present invention. FIG. 6B illustrates an example compiler 180 that can be used in C/C++. FIG. 6C illustrates an example compile-time 190 and run time 192 in C/C++.

Referring to FIG. 6A, the BI register files 18 can be maintained as follows. One of the goals is to initialize and propagate bound information in the BI register file 18 along with program execution. It is kind of dataflow at runtime without the help of program analysis.

The approach is as follows. The BI register files 18 are automatically managed by hardware. No instruction is added. There is an inspection of the BI register file 18 use for each instruction.

When a load/store is executed 130, the BI register file 18 that is paired with the source address pointer is initialized with BI that is loaded for bound checking 132 (See also reference 194 for hardware inserts for bound checking in FIG. 6C). For example, referring back to FIG. 3, for GPR3=load GPR5, BIR5 is to be set to the BI used for bound checking for this load.

Referring back to FIG. 6A, when a register is assigned an immediate value 134, the BI register 18 paired with the result register is set to a "Not-pointer" state with value "−1" as seen in FIG. 4 in BIR1 (step 136). For example, for GPR7=100, BIR7 to be set to "Not-pointer".

When a register is calculated with one source register 138, the system 100 copies the BI register file 18 for the source register to the BI register file 18 for the result register 140. For example, for GPR3=GPR7+10, BIR3 is assigned with BIR7.

When a register is calculated with more than one source registers 142 the following can occur. If only one BI register 18 of the source registers is not a "Not-pointer", then the system 100 copies that BI register to the BI register of the result register 144.

For example, for a pointer q, p. q=p+idx as GPR3=GPR7+GPR8, BIR3 is assigned with BIR7 if p has BI in BI register 18.

Otherwise, the system 100 assigns a "Not-pointer" to the BI register 18 (step 146). For example, for float computation z=x+y as GPR3=GPR7+GPR8, BIR3 is assigned with NULL-BI. Another example is for register=0 as R3=R3 xor R3, BIR3 is assigned with Not-pointer. Yet, another example is for pointer subtraction offset=p−q as GPR3=GPR7-GPR8, BIR3 is assigned with Not-pointer.

When a register is loaded from memory 148, the BI register 18 is paired with the result register is set "Not-pointer" unless compiler 180 marked this load as a load of pointer 150. For example, for int x=*p as GPR3=load GPR7, BIR3 is assigned with Not-pointer. Another example is that for int*q=*p as GPR3=pointer-load GPR7, BIR3 is assigned with (index, N/A, N/A) the index is retrieved from the unused bits in GPR3.

However, if the load is specially marked by compiler 180 to being loaded bound information 152, the BI register 18 paired with the result register is set as "BI-loaded" 154. For example, for int *q=*p as GPR3=pointer-BI-load GPR7, bound information for pointer in GPR3 is loaded and assigned to BIR3. The bound information for the pointer in GPR3 is loaded using information from the "index bits" in GPR3. This is a kind of prefetching BI. ISA support is needed, where either change the existing load instruction to use one-bit to indicate the prefetching or introduce a BI prefetching instruction, such as GPRi=BI_Load GPRi.

When "createBI" (create bound information) is called 156, the BI register paired with the address pointer is set with its BI 158. This step is optional for better performance, and extra ISA support is needed.

Referring back to FIG. 3 and FIG. 6, the BI register files 18 are used as follows. The Load/store instruction tries to use the BI register (BIRn) 44 paired with its address register (GPRn) 42 (step 160). The system 100 checks whether BIRn 44 is BI-loaded, and BIRn 44 contains the same index as that in the address pointer 162. If the result of the check is yes, then use the LB and UB in BIRn for bound check 164. Otherwise, a load request for bound information has to be issued 166.

The check of the index is necessary because of the following. When a pointer is out-of-bound, the index value in its unused bits may be changed. The check can detect such cases.

FIG. 7 illustrates example instructions in an embodiment of present invention. The results at the end of instructions are shown for columns BIRp, BIRq, and BIRr (pointers p, q, r).

FIG. 8A illustrates an example load instruction 402 in an embodiment of present invention. FIG. 8B illustrates an example store instruction 412 in an embodiment of present invention.

Figure 9A:
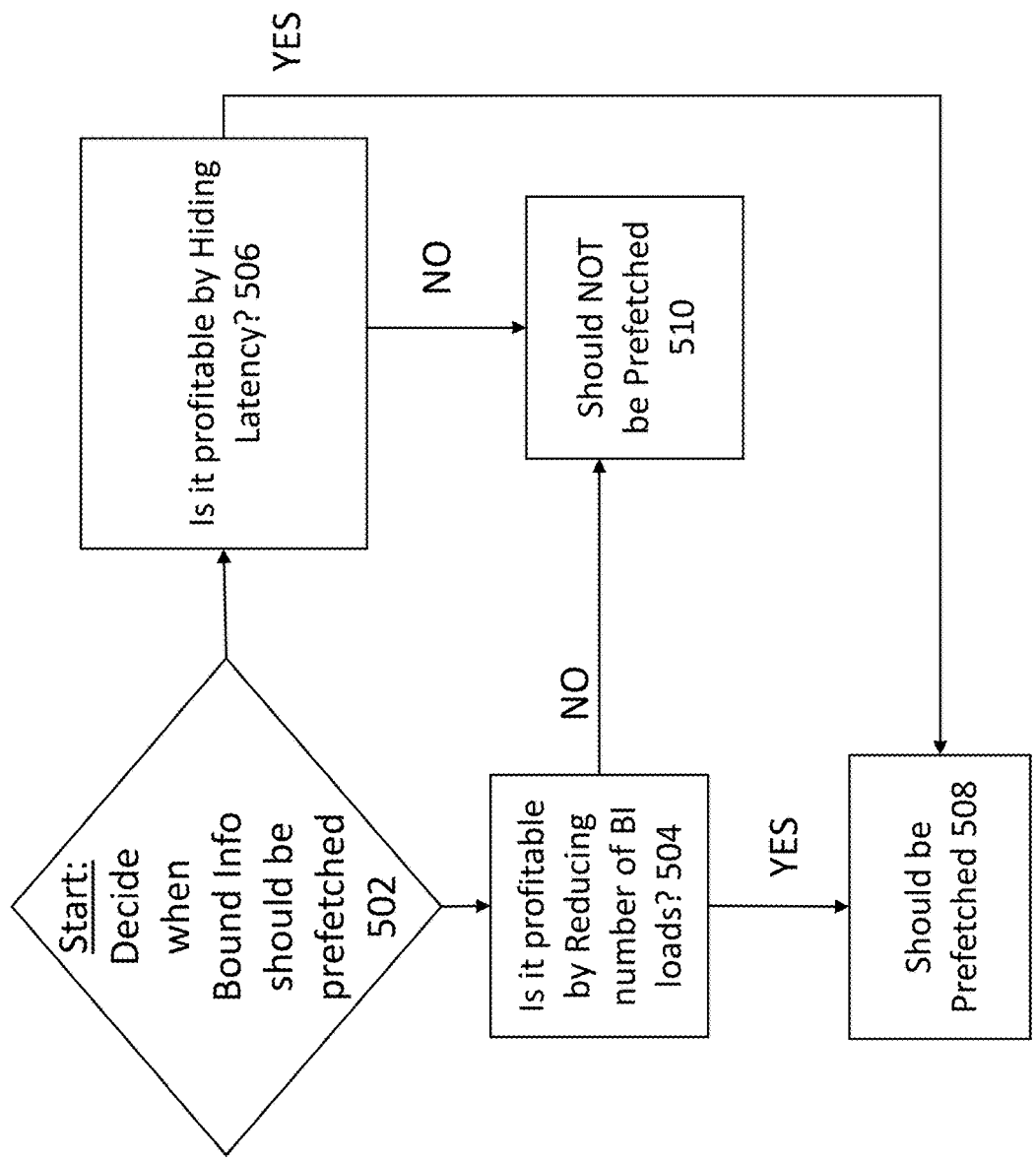
FIG. 9A illustrates when bound information should or should not be prefetched in an embodiment of present invention.

FIG. 9A illustrates when bound information should or should not be prefetched in an embodiment of present invention.

When bound information should be prefetched is shown as follows. The fetching of bound information is profitable when there is a possibility to reduce the number of BI loads, or hide the latency.

FIG. 9A includes a start of the decision of when bound information should be prefetched 502. The system 100 decides on whether is it profitable by reducing the number of BI loads at step 504. If the system 100 decides "yes", then the bound information should be prefetched 508. If the system 100 decides "no", then bound information should not be prefetched 510.

The system 100 also looks whether is it profitable if the latency is hidden at step 506. If the system 100 decides "yes", then the bound information should be prefetched 508. If the system 100 decides "no", then bound information should not be prefetched 510.

Figure 9B:
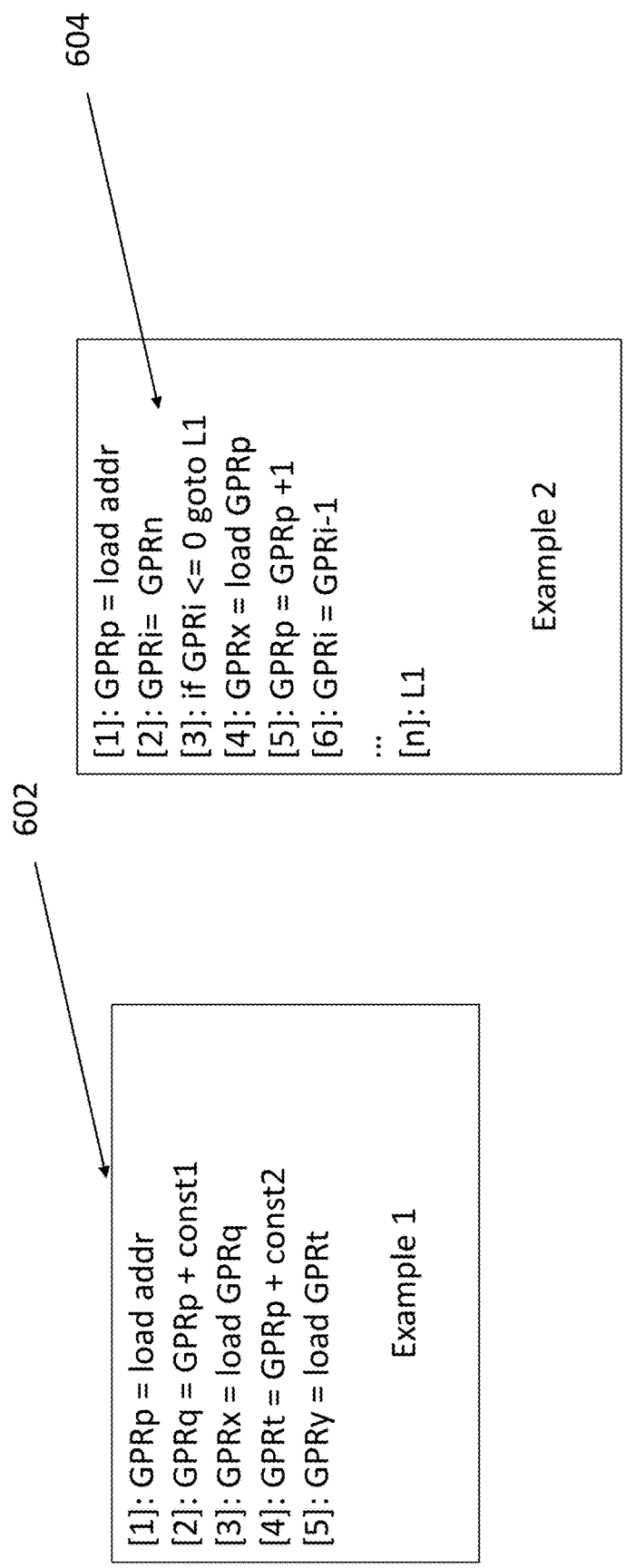
FIG. 9B illustrates examples when bound information should or should not be prefetched in an embodiment of present invention.

FIG. 9B illustrates examples when bound information should or should not be prefetched in an embodiment of present invention.

In example 1 (602) there is reduction in the number of loads. If the load at [1] is marked, bound info for Rp will be load to BIRp. BIRp is copied to BIRq at [2], and to BIRt at [4]. The load at [3] and [5] can use its BI register 18 for bound checking, without a load request for BI. If the load at [1] is not marked, both load at [3] and [5] will need to fetch BI. They use different registers.

When bound information should Not be Prefetched is shown in example 2 (604). In Example 2 (604), the load at [1] that should not be prefetched. The number of BI requests remain the same. The first execution of load at [4] will be initialized BIRp. The BIRp will be propagated to [4] along loop execution. There is no more load BI for the following execution of load at [4]. There is not much latency hiding. There are only two simple instructions between [1] and [4]. The loading BI at [1] may not be used and [4] is in a branch and may not be executed.

Referring back to FIGS. 1, 6B and 6C, how a compiler 180 decides is shown in the following. Basically, a compiler 180 runs a static data flow analysis to find out whether a load of pointer should be marked or not. The decision is just a performance issue, not a correctness issue. Heuristics are used to simplify the problem and deal with unknown factors.

The system 100 chooses the approach to deal each load of pointer separately as follows. The system considers only the subgraph of a program dominated and influenced by this load. If the load is marked for prefetching BI, there is ONE load of BI for this subgraph. If this load is not marked, the system 100 counts how many BI loads will be needed for this subgraph. The system 100 takes path possibilities into consideration. Therefore, the system compares and decides. The assumptions are the Index is stored in a pointer's unused bits remains the same all the time. Hardware BI propagation always succeeds.

Building a subgraph impacted by prefetching BI is as follows. It is assumed that a load of pointer is the target, the root load, where S0: ptr=load addr. The system 100 trims the control flow graph and keeps only the nodes that are dominated by this load, S0.

The impact of prefetching can go outside of this range, but is ignored. The system 100 finds all the load/store instructions that may use the BI register prefetched for result register of this load, ptr.

The system 100 can apply points-to analysis with some customization. For example, instead of memory object for pointer, BI for pointer is analyzed. The one generated at S0 for ptr, called BI-root is of interest. Other BI can be ignored. Points-to analysis is a compile-time technique that helps identify relationships between pointer variables and the memory locations that they point to during program execution.

The system 100 can trim the control flow graph and keep only the nodes whose points-to set contains BI-root and is live. The address for Load/store is the consumers.

The result graph, denoted as S0-graph, will be used for the next step as shown below. The example instructions details are as follows. Concerning the state set note below, basically the compiler runs a static data flow analysis to find out whether a load of pointer should be marked or not for prefetching. During the traversal of control flow graph, there is a reliance on those three references to describe a node. "v: pointer for points-to element, mo: memory object pointed to p: path possibility info can be value in [0, 1], or state {definite, maybe}".

Element in state set: tuple (v, mo, p)
v: pointer for points-to element
mo: memory object pointed to
p: path possibility information
can be value in [0, 1], or state {definite, maybe}
The Start node: ptr1=load addr
GEN={(ptr1, bi-obj, 1)}
Arithmetic instructions: ptr2=op(ptr1, other operands)
KILL={(ptr2, mo, p)|(ptr2, mo, p) is in IN}
GEN={(ptr2, mo, p')|(ptr1, mo, p) is in IN and p' is the current path}
Load/store instructions: load address or store address It is assumed to only use the BI registers 18. If a different bound information is loaded due to the check, that bound information is not a concern here.

Transfer function: OUT=IN−KILL+GEN

Merge function: when (ptr, mo, p1) and (ptr, mo, p2) come from two paths, the result is Optr, mo, p1+p2).

The system 100 calculates the following when there is no prefetching. The system 100 finds the load/store that is needed to load BI, that not from the BI register 18. The system 100 starts from load/store close to the root load and expands. The system 100 identifies load/store can use BI register due to another load/store. The system 100 repeats until all load/store can covered. Example non-limiting instructions are as follows:

```
Work_graph = S0-graph;
Saved = 0;
While (work_graph still contains load/store other than S0) {
  Idom_set = {load/store in work_graph which is immediately dominated by s0}
  For instruction si: load addr or store addr in idom {
    p is the path possibility of si;
    Add KILL of {(addr, bi-obj, p)} to si
    Saved += p
  }
  Run dataflow again;
  Work_graph = work_graph − idom_set − all load/store which does not use bi-obj does not reach;
}
If (saved > 1) mark s0 for prefetching BI
```

Figure 10:
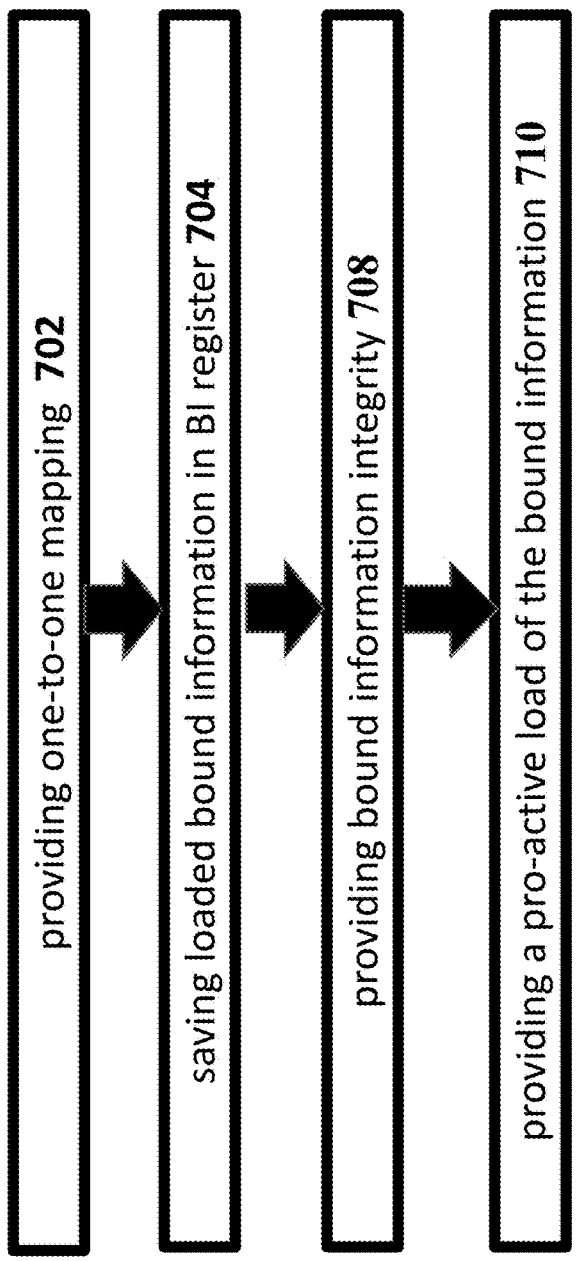
FIG. 10 illustrates an embodiment of present invention.

FIG. 10 illustrates an embodiment of present invention. Any of the following steps shown can be performed in parallel or a different sequence.

The system 100 provides one-to-one mapping to general-purpose registers 16 and the bound information (BI) in the BI register 18 (Step 702).

The system 100 saves loaded bound information in BI register 18 for future use 704. The system 100 provides that bound information integrity in the BI register 18 is maintained along program execution 708.

The system 100 provides a pro-active load of the bound information with one-bit extra control on load instruction of the BI register 18 (step 710). A compiler 180 determines candidate loads for the pro-active load of bound information.

The system 100 manages loads of bound information to minimize memory bandwidth requirements or hide load latency. The system selects profitable cases with static program analysis. The system 100 determines a prefetching of the bound information based on whether bound information loads are reduced. The system 100 determines a prefetching of the bound information based on a determination of hiding latency. The bound information in the bound information register 18 is initialized and propagated along with program execution.

Therefore, the present invention is able to provide precise protection where the system 100 protects every buffer and precision is down to byte while still reducing load requests for bound information. The present invention is applicable on legacy programs such as C/C++ applications, including arbitrary pointer arithmetic and number of buffers to be protected in one application may range from thousands to millions.

Therefore, as shown above, hardware components are BI registers 18. One-to-one mapping to general-purpose registers 16 and the BI in BI register 18 automatically provided. The system 100 saves the loaded bound information in the BI register 18 for future use. The bound information integrity in the BI register 18 is automatically maintained along program execution. The pro-active load of BI is supported with one-bit extra control on load instruction.

The software component includes a compiler 180 that determines the candidate loads for pro-active load of bound information. The compiler 180 further reduces load request for bound information, or hide load latency. The system 100 chooses the profitable cases with static program analysis.

Different features shown in different figures from FIGS. 1 through 10 can be combined, changed or switched between the different examples. Systems 100 and 200 are merely shown as a non-limiting example for illustration purposes. Any other configuration could be used. For example, the systems 100 and 200 shown in FIGS. 1 through 10 can also be implemented in hardware and software shown in FIGS. 11 through 15.

Figure 11:
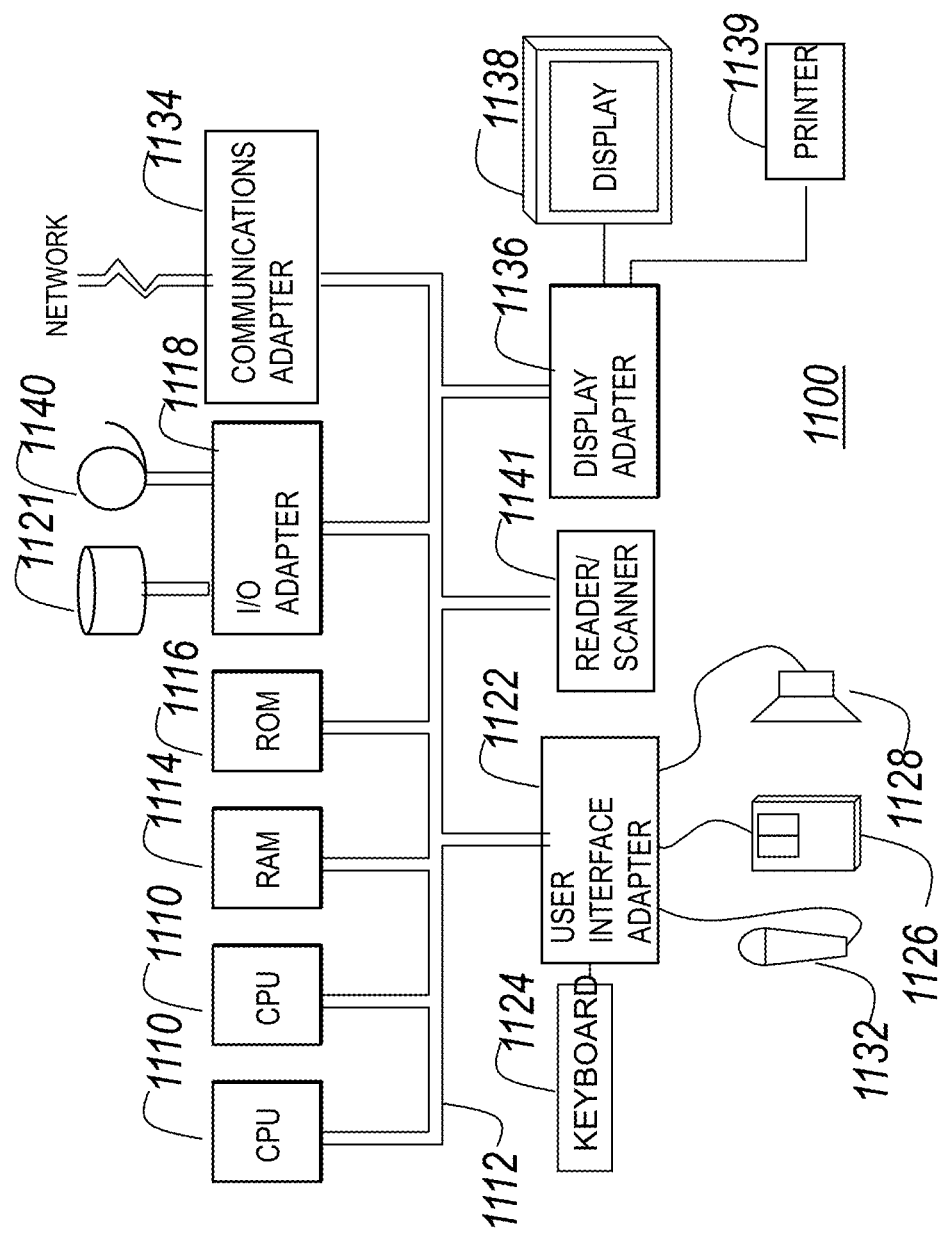
FIG. 11 illustrates an exemplary hardware/information handling system for incorporating the example embodiment of the present invention therein.
Figure 12:
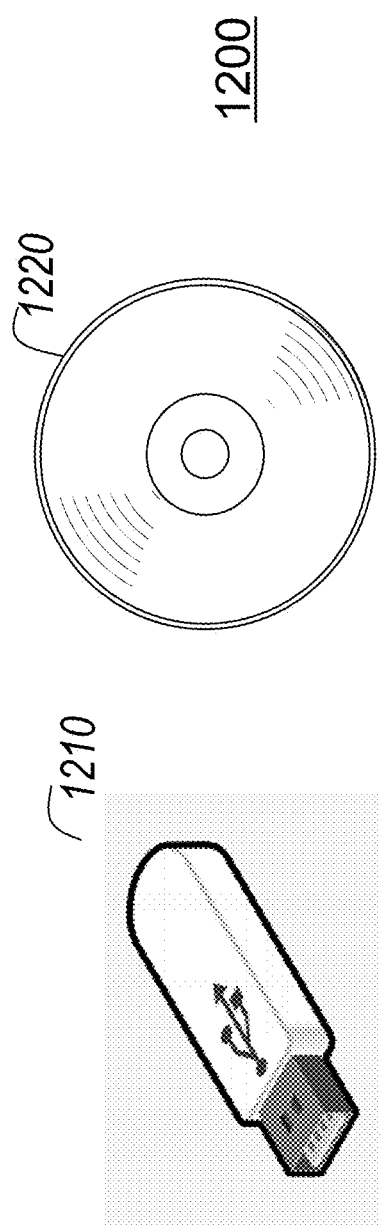
FIG. 12 illustrates a signal-bearing storage medium for storing machine-readable instructions of a program that implements the method according to the example embodiment of the present invention.

FIG. 11 illustrates another hardware configuration of the system, where there is an information handling/computer system 1100 in accordance with the present invention and which preferably has at least one processor or central processing unit (CPU) 1110 that can implement the techniques of the invention in a form of a software program for software intelligence as-a-service.

The CPUs 1110 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing storage media tangibly embodying a program of machine-readable instructions executable by a digital data processor incorporating the CPU 1110 and hardware above, to perform the method of the invention.

This signal-bearing storage media may include, for example, a RAM contained within the CPU 1110, as represented by the fast-access storage for example.

Alternatively, the instructions may be contained in another signal-bearing storage media 1200, such as a flash memory 1210 or optical storage diskette 1220 (FIG. 12), directly or indirectly accessible by the CPU 1110.

Whether contained in the flash memory 1210, the optical disk 1220, the computer/CPU 1110, or elsewhere, the instructions may be stored on a variety of machine-readable data storage media.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 13:
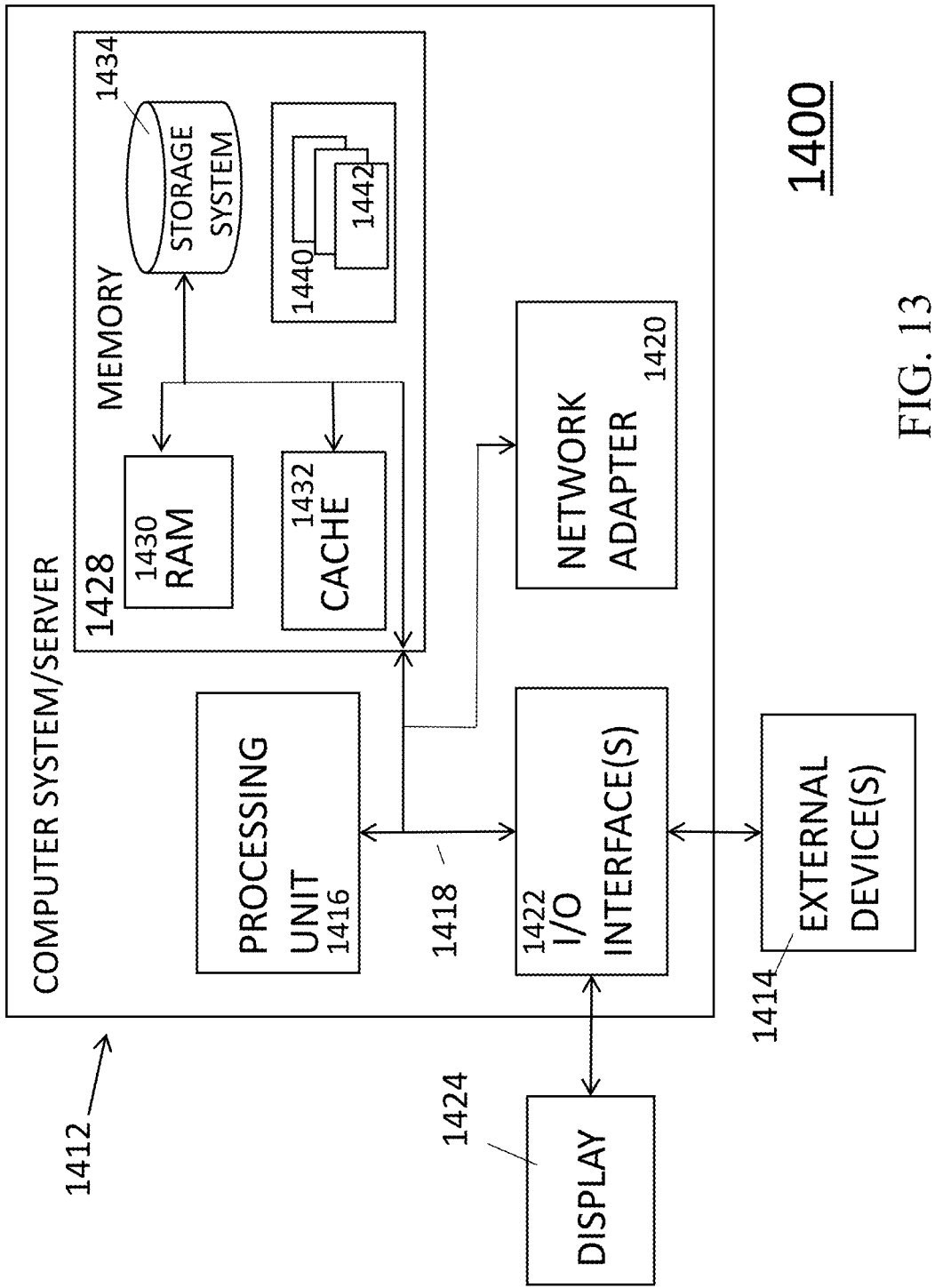
FIG. 13 depicts a cloud computing node according to an example embodiment of the present invention.

Referring now to FIG. 13, a schematic 1400 of an example of a cloud computing node is shown. Cloud computing node 1400 is only one example of a suitable cloud computing node and is not intended to suggest any limitation as to the scope of use or functionality of embodiments of the invention described herein. Regardless, cloud computing node 1400 is capable of being implemented and/or performing any of the functionality set forth hereinabove. As mentioned previously, system 100 of FIG. 1 can be implemented in a cloud infrastructure such as FIG. 13 (and also FIGS. 14 and 15). In cloud computing node 1400 there is a computer system/server 1412, which is operational with numerous other general purpose or special purpose computing system environments or configurations. Examples of well-known computing systems, environments, and/or configurations that may be suitable for use with computer system/server 1412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 1412 in cloud computing node 1400 is shown in the form of a general-purpose computing device. The components of computer system/server 1412 may include, but are not limited to, one or more processors or processing units 1416, a system memory 1428, and a bus 1418 that couples various system components including system memory 1428 to processor 1416.

Bus 1418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1412 typically includes a variety of computer system readable media. Such media may be any available media that is accessible by computer system/server 1412, and it includes both volatile and non-volatile media, removable and non-removable media.

System memory 1428 can include computer system readable media in the form of volatile memory, such as random-access memory (RAM) 1430 and/or cache memory 1432. Computer system/server 1412 may further include other removable/non-removable, volatile/non-volatile computer system storage media. By way of example only, storage system 1434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1418 by one or more data media interfaces. As will be further depicted and described below, memory 1428 may include at least one program product having a set (e.g., at least one) of program modules that are configured to carry out the functions of embodiments of the invention.

Program/utility 1440, having a set (at least one) of program modules 1442, may be stored in memory 1428 by way of example, and not limitation, as well as an operating system, one or more application programs, other program modules, and program data. Each of the operating system, one or more application programs, other program modules, and program data or some combination thereof, may include an implementation of a networking environment. Program modules 1442 generally carry out the functions and/or methodologies of embodiments of the invention as described herein.

Computer system/server 1412 may also communicate with one or more external devices 1414 such as a keyboard, a pointing device, a display 1424, etc.; one or more devices that enable a user to interact with computer system/server 1412; and/or any devices (e.g., network card, modem, etc.) that enable computer system/server 1412 to communicate with one or more other computing devices. Such communication can occur via Input/Output (I/O) interfaces 1422. Still yet, computer system/server 1412 can communicate with one or more networks such as a local area network (LAN), a general wide area network (WAN), and/or a public network (e.g., the Internet) via network adapter 1420. As depicted, network adapter 1420 communicates with the other components of computer system/server 1412 via bus 1418. It should be understood that although not shown, other hardware and/or software components could be used in conjunction with computer system/server 1412. Examples, include, but are not limited to: microcode, device drivers, redundant processing units, external disk drive arrays, RAID systems, tape drives, and data archival storage systems, etc.

Figure 14:
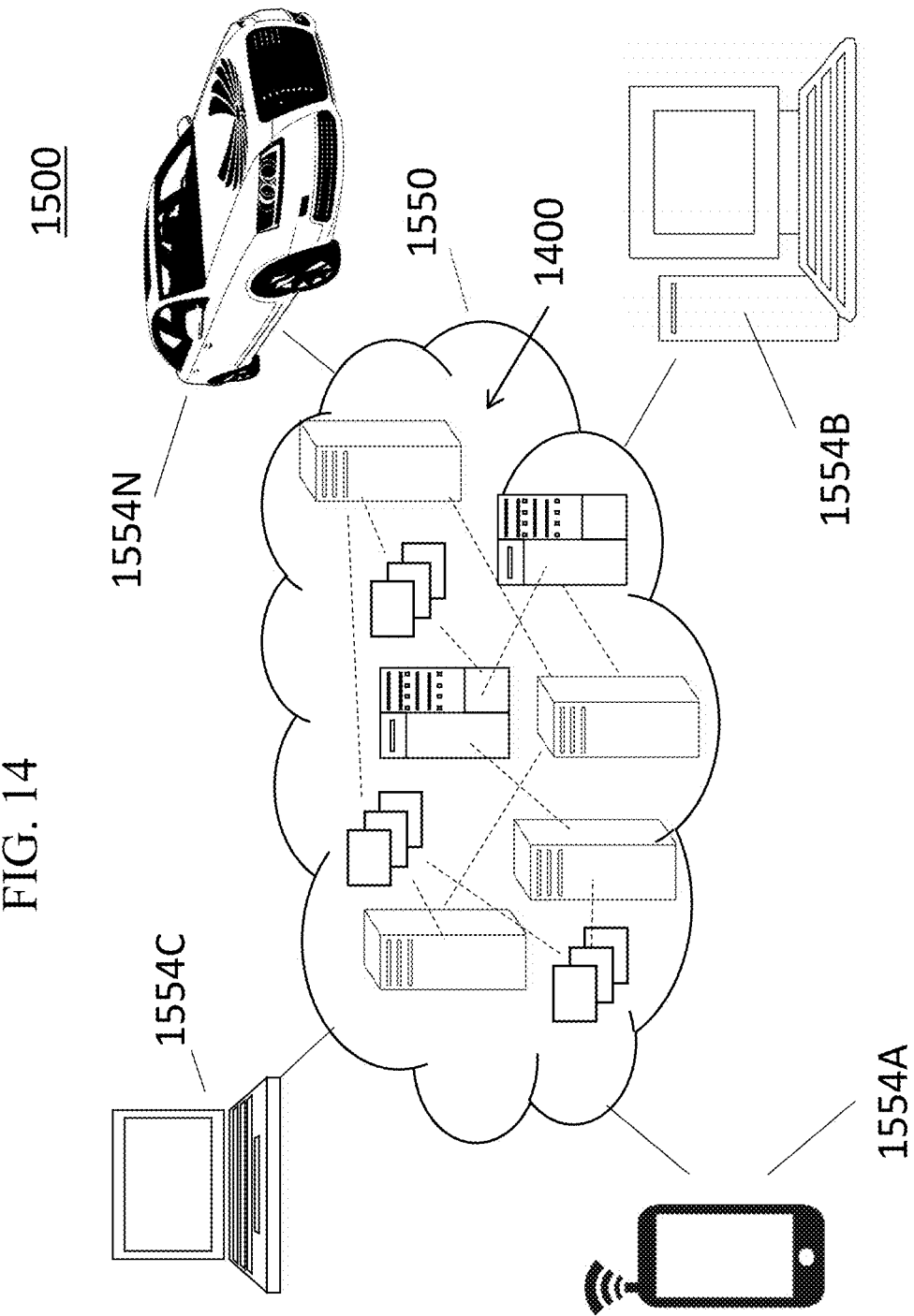
FIG. 14 depicts a cloud computing environment according to an example embodiment of the present invention.

Referring now to FIG. 14, illustrative cloud computing environment 1550 is depicted. As shown, cloud computing environment 1550 includes one or more cloud computing nodes 1400 with which local computing devices used by cloud consumers, such as, for example, personal digital assistant (PDA) or cellular telephone 1554A, desktop computer 1554B, laptop computer 1554C, and/or automobile computer system 1554N may communicate. Nodes 1400 may communicate with one another. They may be grouped (not shown) physically or virtually, in one or more networks, such as Private, Community, Public, or Hybrid clouds as described hereinabove, or a combination thereof. This allows cloud computing environment 1550 to offer infrastructure, platforms and/or software as services for which a cloud consumer does not need to maintain resources on a local computing device. It is understood that the types of computing devices 1554A-N shown in FIG. 16 are intended to be illustrative only and that computing nodes 1400 and cloud computing environment 1550 can communicate with any type of computerized device over any type of network and/or network addressable connection (e.g., using a web browser).

Figure 15:
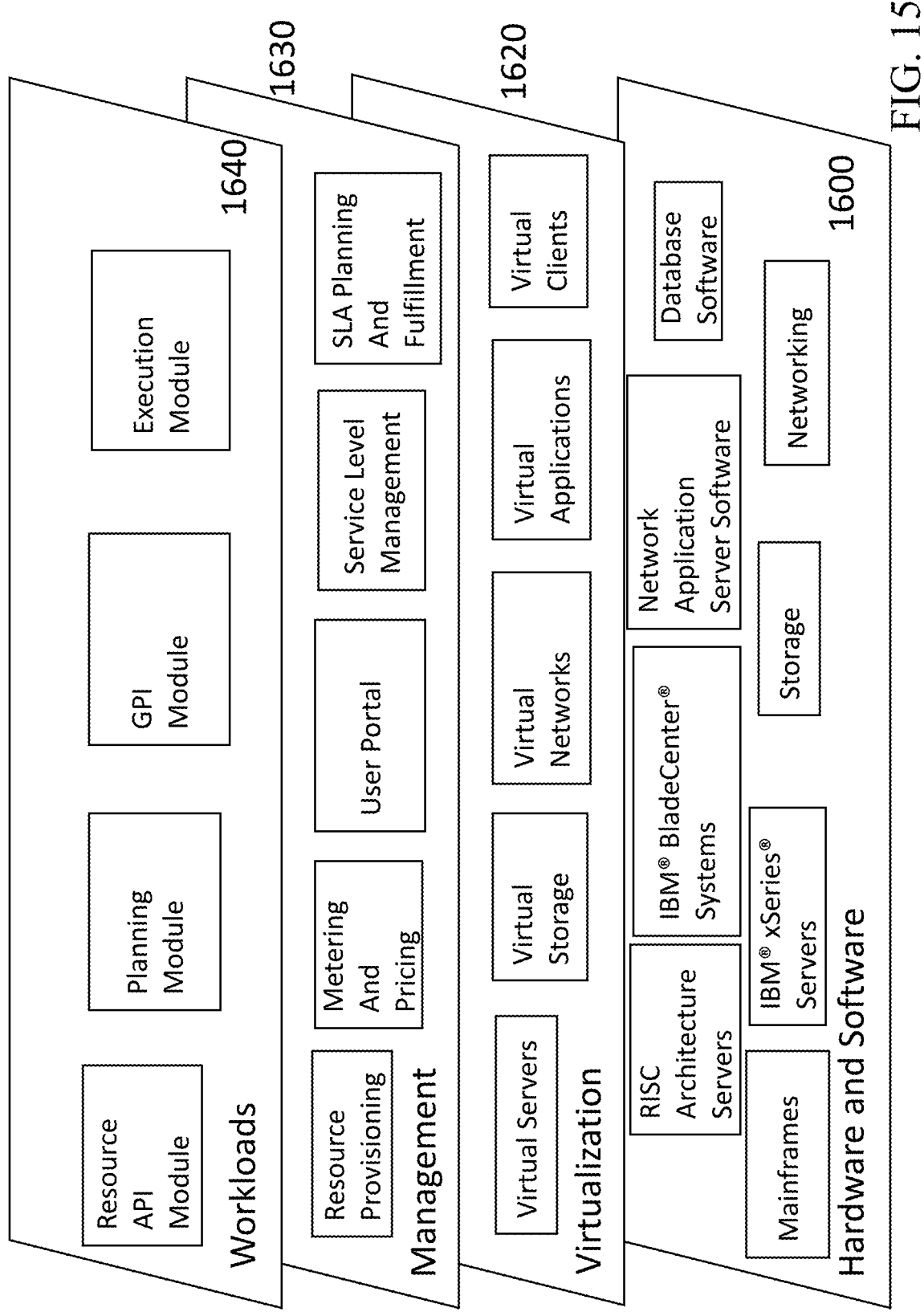
FIG. 15 depicts abstraction model layers according to an example embodiment of the present invention.

Referring now to FIG. 15, a set of functional abstraction layers provided by cloud computing environment 1550 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 1600 includes hardware and software components. Examples of hardware components include mainframes, in one example IBM® zSeries® systems; RISC (Reduced Instruction Set Computer) architecture based servers, in one example IBM p Series® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, Web Sphere, and DB2 are trademarks of International Business Machines Corporation registered in many jurisdictions worldwide).

Virtualization layer 1620 provides an abstraction layer from which the following examples of virtual entities may be provided: virtual servers; virtual storage; virtual networks, including virtual private networks; virtual applications and operating systems; and virtual clients.

In one example, management layer 1630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 1640 provides examples of functionality for which the cloud computing environment may be utilized. Examples of workloads and functions which may be provided from this layer include such functions as mapping and navigation; software development and lifecycle management; virtual classroom education delivery; data analytics processing; transaction processing; and, more particularly relative to the present invention, the APIs and run-time system components of generating search autocomplete suggestions based on contextual input.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A method for providing bound information access, the method comprising:
   responsive to receiving, at the general-purpose register, one or more pointers associated with one or more load/store instructions of one or more programs, loading one or more boundary information (BI) registers, wherein the general-purpose register and the one or more BI registers are mapped one-to-one;
   determining that one or more loads of bound information associated with the one or more pointers are profitable loads;
   prefetching bound information associated with the one or more profitable loads into the one or more BI registers;
   loading bound information associated with one or more of the one or more loads into the one or more BI registers; and
   propagating the bound information in the one or more BI registers along execution of the program.

2. The method according to claim 1, wherein the one or more profitable loads comprise one or more loads that hide latency.

3. The method according to claim 1, wherein the one or more profitable loads comprise one or more loads that reduce a number of the loads of bound information.

4. The method according to claim 1, wherein the determining is performed using static program analysis.

5. The method according to claim 1, wherein the determining is based on a number of the load/store instructions that would use the one or more BI registers prefetched for the one or more loads.

6. The method of claim 1, wherein the determining is performed by a compiler applying a points-to analysis.

7. The method according to claim 1, wherein the one or more BI registers comprise hardware components.

8. A system for providing bound information access, the system comprising:
   one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
   responsive to receiving, at the general-purpose register, one or more pointers associated with one or more load/store instructions of one or more programs, loading one or more boundary information (BI) registers, wherein the general-purpose register and the one or more BI registers are mapped one-to-one;
   determining that one or more loads of bound information associated with the one or more pointers are profitable loads;
   prefetching bound information associated with the one or more profitable loads into the one or more BI registers;
   loading bound information associated with one or more of the one or more loads into the one or more BI registers; and
   propagating the bound information in the one or more BI registers along execution of the program.

9. The system according to claim 8, wherein the one or more profitable loads comprise one or more loads that hide latency.

10. The system according to claim 8, wherein the one or more profitable loads comprise one or more loads that reduce a number of the loads of bound information.

11. The system according to claim 8, wherein the determining is performed using static program analysis.

12. The system according to claim 8, wherein the determining is based on a number of the load/store instructions that would use the one or more BI registers prefetched for the one or more loads.

13. The system according to claim 8, wherein the determining is performed by a compiler applying a points-to analysis.

14. The system according to claim 8, wherein the one or more BI registers comprise hardware components.

15. A computer program product for providing bound information access, the computer program product comprising:
   one or more computer-readable tangible storage medium and program instructions stored on at least one of the one or more tangible storage medium, the program instructions executable by a processor to cause the processor to perform a method comprising:
   responsive to receiving, at the general-purpose register, one or more pointers associated with one or more load/store instructions of one or more programs, loading one or more boundary information (BI) registers, wherein the general-purpose register and the one or more BI registers are mapped one-to-one;
   determining that one or more loads of bound information associated with the one or more pointers are profitable loads;
   prefetching bound information associated with the one or more profitable loads into the one or more BI registers;
   loading bound information associated with one or more of the one or more loads into the one or more BI registers; and
   propagating the bound information in the one or more BI registers along execution of the program.

16. The computer program product according to claim 15, wherein the one or more profitable loads comprise one or more loads that hide latency.

17. The computer program product according to claim 15, wherein the one or more profitable loads comprise one or more loads that reduce a number of the loads of bound information.

18. The computer program product according to claim 15, wherein the determining is performed using static program analysis.

19. The computer program product according to claim 15, wherein the determining is based on a number of the load/store instructions that would use the one or more BI registers prefetched for the one or more loads.

20. The computer program product according to claim 15, wherein the determining is performed by a compiler applying a points-to analysis.

* * * * *